T. A. ROBERTSON.
Shovel Plow.
No. 23,395.
Patented Mar. 29, 1859.
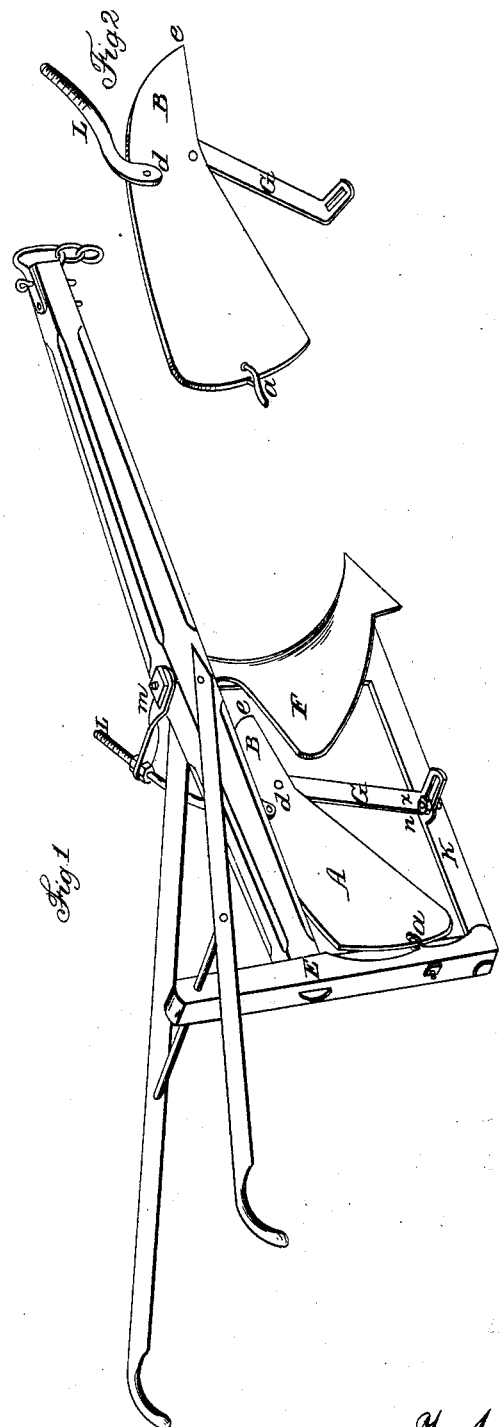
Witnesses
Chas G Page
Wm H Harrison
Inventor.
T. A. Robertson

UNITED STATES PATENT OFFICE.

THOMAS A. ROBERTSON, OF WASHINGTON, DISTRICT OF COLUMBIA.

IMPROVEMENT IN CULTIVATORS.

Specification forming part of Letters Patent No. 23,395, dated March 29, 1859.

*To all whom it may concern:*

Be it known that I, THOS. A. ROBERTSON, of Washington, in the county of Washington and District of Columbia, have invented an Improvement in Weeding-Plows; and I do hereby declare that the following is a full, clear, and exact description of the principle or character which distinguishes it from all other things before known, and of the usual manner of making, modifying, and using the same, reference being had to the accompanying drawings, of which—

Figure 1 is a perspective view of the plow; Fig. 2, a detached view of the wing, divider, and upper and lower braces.

My improvement in weeding-plows consists in a peculiar construction, arrangement, and adjustment of the wing or landside scraper and gatherer A, described as follows: This wing is attached by a swivel or hook, $a$, at its rear end to the rear standard, E, of the plow, and extends forward and obliquely outward to the point $d$, where it changes direction and extends straight forward or parallel to the line of the landside of the plow. The width of the wing at its rear end is about equal to the height of the mold-board F, and diminishes gradually to the point $d$, from which point it diminishes rapidly to the extreme forward point, $e$. The portion of the wing in rear of the point $d$ is called the "scraper and gatherer," and the portion in advance of this point is called the "divider," B. The lower edge of the wing runs obliquely upward, as shown in the drawings. At the meeting of these two portions the wing is sustained by an upper adjustable brace, L, and by an adjustable cutter, G, acting as a brace. The brace L adjusts upon the end of the fixed arm $m$, proceeding from the plow-beam, as clearly shown in the drawings, and the cutter-bar or brace G adjusts on the arm or leg $n$, fixed upon the sole K of the landside by means of the screw-bolt $x$ and the slot in the end of the bar, as shown in the drawings. The front edge of the bar G is a cutting-edge, and extends obliquely upward till it meets the lower edge of the wing.

The operation of the several parts thus described is as follows: The plow is to be used for weeding tobacco and other crops. The point of the plow being started between the rows of plants in such position that the divider will run as near to the plant as desirable, the plow is put in to such depth that the cutter G will cut under the surface slightly and shear off the weeds at the right depth, while the scraper and gatherer carries them over and leaves them with the loose earth in the middle of the furrow or in rear of the plow-standard. Having gone through with one side, the plow is brought back in the same row to weed the other side. Previous to this weeding the earth is hilled up on either side, and I therefore give the upward slope to the cutting-edge of G and the lower edge of wing A, by which means, and with the assistance of the weed-divider, the weeding may be performed with safety very close to the plants.

What I claim as my improvement in weeding-plows is—

The wing A, extending obliquely from the rear standard, E, to a point, $d$, from which point projects a straight portion or divider, B, in combination with the oblique cutting-bar G, as described.

T. A. ROBERTSON.

Witnesses:
CHAS. G. PAGE,
WM. H. HARRISON.